Nov. 23, 1965  J. CADIOU  3,219,153
DISC BRAKES CONTROLLED BY A PAIR OF LEVERS, IN PARTICULAR
FOR AUTOMOBILE VEHICLES
Filed Feb. 3, 1964  3 Sheets-Sheet 1

INVENTOR
Jean Cadiou
BY
Stevens, Davis, Miller & Mosher
ATTORNEYS

Nov. 23, 1965  J. CADIOU  3,219,153
DISC BRAKES CONTROLLED BY A PAIR OF LEVERS, IN PARTICULAR
FOR AUTOMOBILE VEHICLES
Filed Feb. 3, 1964  3 Sheets-Sheet 2
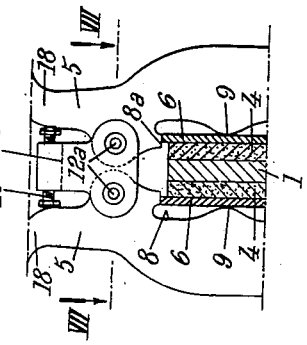
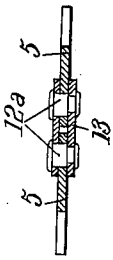
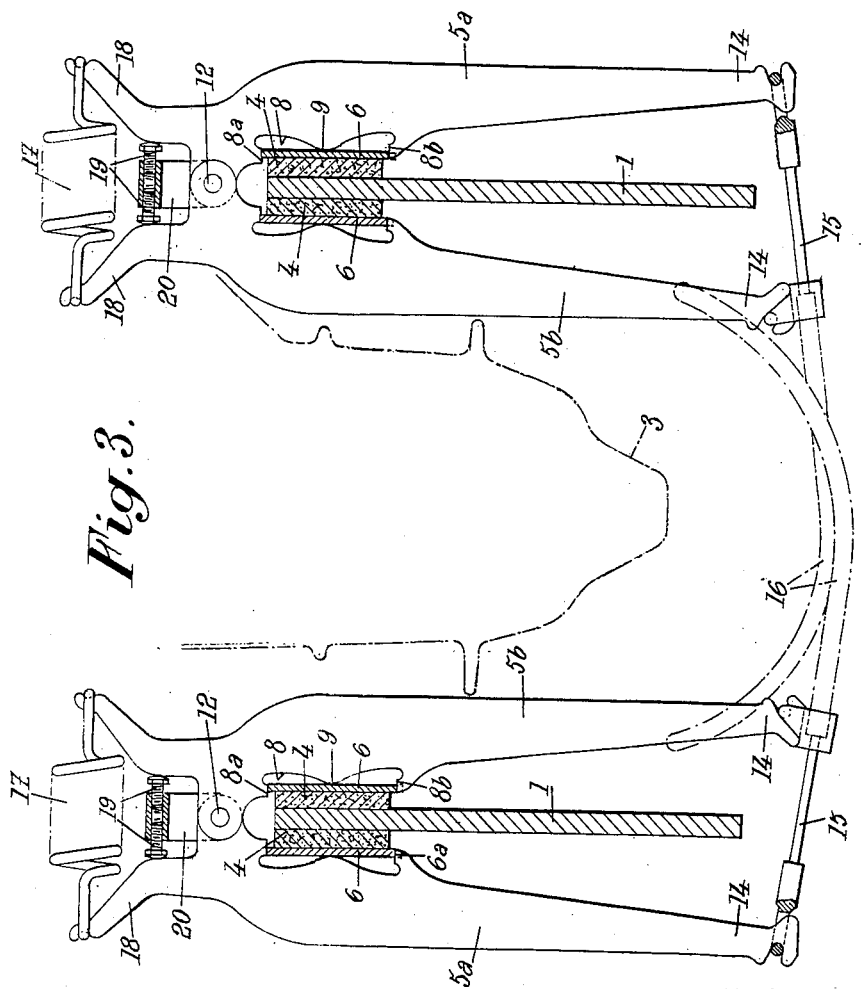
INVENTOR
Jean Cadiou
BY
Stevens, Davis, Miller & Mosher
ATTORNEYS United States Patent Office 3,219,153
Patented Nov. 23, 1965

3,219,153
DISC BRAKES CONTROLLED BY A PAIR OF LEVERS, IN PARTICULAR FOR AUTOMOBILE VEHICLES
Jean Cadiou, Paris, France, assignor to Société Anonyme Andre Citroën, Paris, France, a society of France
Filed Feb. 3, 1964, Ser. No. 341,866
Claims priority, application France, Feb. 5, 1963, 923,810
1 Claim. (Cl. 188—73)

The present invention relates to disc brakes of the type wherein friction linings mounted on opposed sides of a disc and movable in the axial direction (that is to say in a direction parallel to the axis of the disc) can be applied against the opposed faces of the disc respectively by two levers located on respective opposed sides of said disc, said levers being movable in a plane perpendicular to that of the disc. The invention is more especially concerned with auxiliary brakes (actuated directly by the driver) provided on automobile vehicles in addition to the main brakes (actuated by a source of energy such as a fluid under pressure).

The chief object of the present invention is to provide a brake of the above-mentioned type which is better adapted to meet the requirements of practice, in particular of simpler and more economical construction and of easier upkeep and adjustment.

In a brake according to the present invention, each of the brake linings is carried by a small plate mounted on a pivot substantially parallel to the disc axis so as to be not only rotatable about this pivot but also slidable along it, means are provided on each of the levers for guiding the corresponding plate so that it can slide along said pivot but not rotate about it, and the mutual location of this pivot and of the guiding means is such that, when the braking action is exerted, the resultant of the peripheral forces developed on every lining and plate system (which resultant is perpendicular to the plane passing through the axis of the disc and through the point of application of this resultant) passes through the corresponding pivot.

According to another feature of the present invention, considering the cylinder generated by a straight line parallel to the axis of the disc and bearing against the external outline of this disc, the plane in which can move each of the levers intersects said cylinder in such manner that the pivot axis of every lever and the point where it is linked to the distance control mechanism, such as a cable under a sheath, are both on the outside of said cylinder but in regions remote from each other on the periphery of said cylinder.

Preferred embodiments of the present invention will be hereinafter described with reference to the appended drawings, given merely by way of example, and in which:

FIG. 3 is a transverse section on the line III—III of FIG. 1;

FIG. 6 shows a modification of a detail of FIG. 3;

FIG. 7 is a sectional view on the line VII—VII of FIG. 6.

Figure 1:
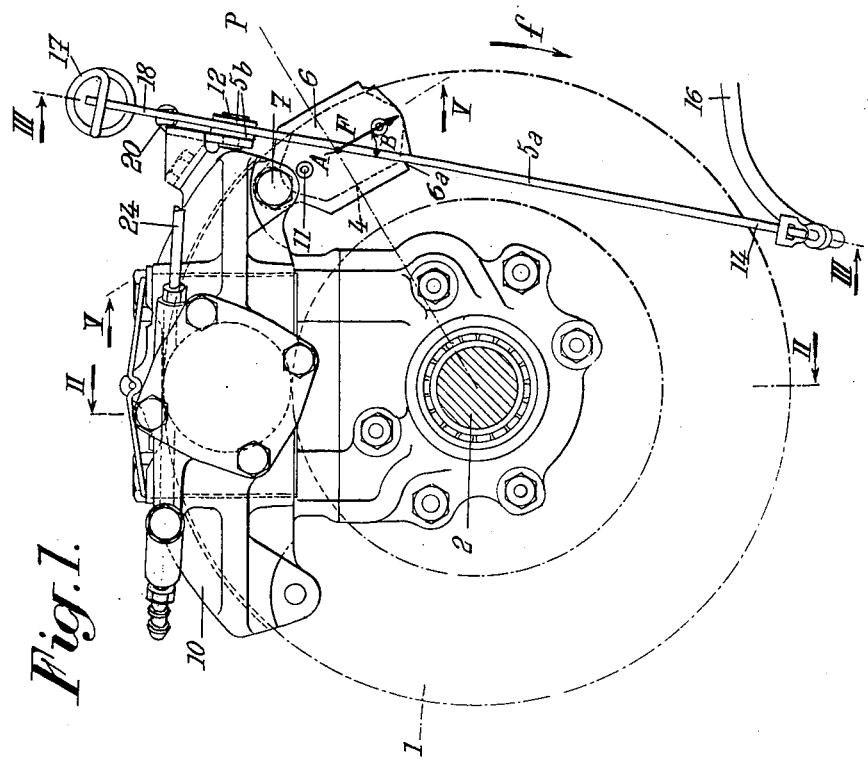
FIG. 1 is a side elevational view of a brake according to the present invention.

The structure shown by the drawings includes two brakes the respective discs 1 of which are coaxial and mounted on half shafts 2, generally horizontal, which constitute the right and left output shafts of a differential gear housed in a casing 3 (which casing is often common with the casing of the gear box of an automobile vehicle having a suspended differential gear, whether in the case of a front engine or in that of a rear engine).

The brake is arranged in such manner that the friction linings 4, mounted on opposed sides of each disc 1 and slidable in the axial direction, can be applied against the opposed faces of the disc respectively by means of two levers 5a and 5b extending on opposed sides of disc 1 and each movable in a plane perpendicular to that of the disc.

Each of the linings 4 is carried by a plate 6 mounted on a pivot 7 (FIG. 5) substantially parallel to the axis of disc 1 so that this plate can not only rotate about of disc 1 but also slide along it. I provide, upon the corresponding lever 5a or 5b, means capable of guiding said plate so that it can slide with respect to said pivot but cannot rotate about it. Said guiding means will be hereinafter described.

Now, according to the present invention the mutual location of said pivot 7 and of said guiding means is determined in such manner that, when braking takes place, the resultant of the peripheral braking forces acting on every plate 6 passes through the corresponding pivot 7. This resultant is shown in FIG. 1 by arrow F for the frontward direction of rotation (indicated by arrow f) and it is perpendicular to the plane P passing through the axis of the disc and through the point of application A of this resultant. It is known that this point A is located, for every lining, at the center of the surface of this lining, this surface being shown in dotted lines in FIG. 1.

In order to constitute said guiding means each of the levers 5a or 5b is provided with a notch 8 surrounding the area 9 along which the lever bears against plate 6. The edges 8a and 8b of this notch 8 are adapted to guide this plate in the above indicated manner.

The pivots 7 corresponding to each disc 1 (see FIG. 5) are in line with each other, said pivots being removable and constituted by screws which are smooth at their free ends, where they receive plates 6. Screws 7 are carried by a support 10 fixed with respect to the plane of disc 1. In the case, shown by FIG. 2, where disc 1 is itself axially fixed on a corresponding shaft 2 support 10 is fixed with respect to casing 3.

Figure 5:
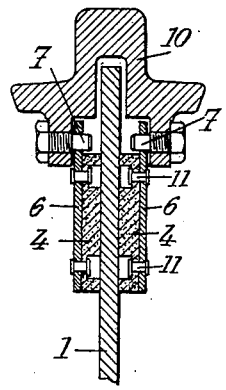
FIG. 5 is a transverse sectional view on the line V—V of FIG. 1.

As shown by FIG. 5, pivot 7 may be located on portions of plate 6 free from linings 4. Said linings are fixed to plates 6 through suitable means, such for instance as rivets 11. As the wear of said linings increases, it is easy to adjust their positions by sliding the plates 6 by which they are supported with respect to pivots 7. The guiding of each plate 6 is advantageously facilitated by a notch 6a provided in the edge thereof and cooperating with a projection 8b of the notch 8 of the corresponding lever 5a or 5b (FIG. 3).

Concerning levers 5a and 5b, considering the geometrical cylinder generated by a straight line parallel to the axis of the disc (that is to say perpendicular to the plane of FIG. 1) and bearing against the external outline of this disc, the plane (perpendicular to FIG. 1) in which each of said levers is movable intersects said cylinder in such manner that the pivot or fulcrum 12 of each of said levers on fixed support 10 and the point where this lever is secured to the distance control mechanism (such as a cable slidable in a sheath) are both located on the outside of said cylinder but in portions thereof remote from each other on the periphery thereof. If the whole of these elements is projected upon the plane of disc 1 (plane of FIG. 1), this means that each of the levers 5a and 5b is disposed along a chord of said disc 1 in such manner that its respective ends are located on the outside of the external outline of said disc 1, the pivot axis 12 being located for instance at the upper end of lever 5a or 5b and the point of action of the distance control means being located at the lower end of the lever that is considered. Preferably the angle B made by resultant R with the plane of levers 5a and 5b (see FIG. 1) is given a value as great as possible in order to reduce to a minimum the component, at right angles to said plane, of the pivoting effort exerted upon each of the linings, this in order to reduce the efforts tending to deform each of the levers transversely.

In a first construction and as shown by FIGS. 1 and 3, levers 5a and 5b are hinged together about a pivot 12 at right angles to the axis of disc 1. Said two levers are slightly different in the portions thereof that are mounted on said pivot 12 so that the remaining portions thereof are disposed exactly in the same plane. For instance lever 5b is provided with a forked portion visible in FIG. 1 which cooperates with a corresponding flat portion of lever 5a. In another embodiment of the invention, shown by FIGS. 6 and 7, instead of such different levers 5a and 5b mounted on a single pivot 12, use is made of two levers 5 hinged by means of two pivots 12a and two links 13. Anyway, pivots 12 or 12a are fixed to support 10.

Whatever be the construction of levers 5a and 5b (or 5), they are operated by a control mechanism secured to their ends 14 (FIGS. 1 and 3). This control mechanism comprises, in the example shown, a cable 15 movable in a sheath 16, cable 15 passing from the end of lever 5a to the sheath carried by the end of lever 5b along a path external to the outer edge of disc 1. In order to facilitate the housing of the two sheaths 16 the levers are slightly offset in the peripheral direction, this offsetting corresponding to the fact that the brake control mechanism 15–16 on the right hand side of FIG. 3 is located at a level slightly higher than that of the mechanism on the left hand side. Of course, discs 1 are coaxial as above stated.

In order to release the brakes, there is provided a return spring 17 interposed between the upper ends 18 of the levers 5a, 5b or 5 corresponding to each of the wheels. Finally in order to take into account the wear and tear of linings 4, there is provided an adjustment system between the ends 18 of every pair of levers 5a, 5b. This system comprises two screws 19 against which bear the inner edges of the levers, said screws being mounted in a stirrup 20 rigid with support 10 and which carries pivot 12, in the embodiment of FIGS. 1 and 3. In the embodiment of FIG. 6 the above-mentioned screws are engaged in a portion 20a of one of the links 13, itself rigid with support 10.

When the brake above described is an auxiliary brake, the main brake being for instance a hydraulically controlled brake, support 10 may be used to carry the main brake.

Figure 2:
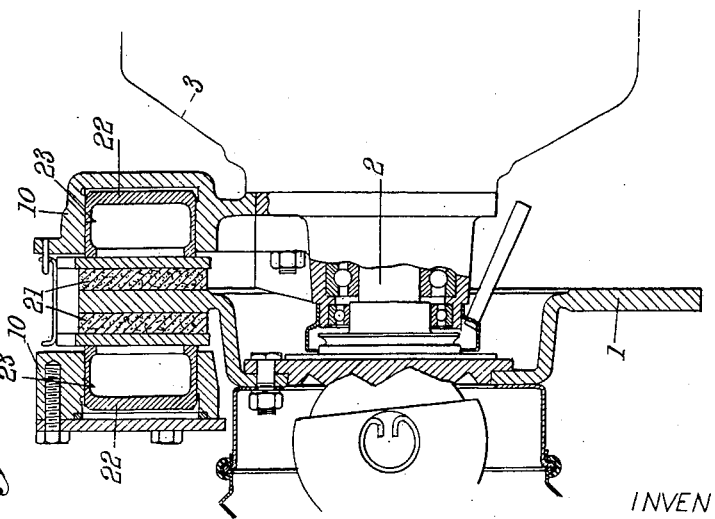
FIG. 2 is a transverse section on the line II—II of FIG. 1.
Figure 4:
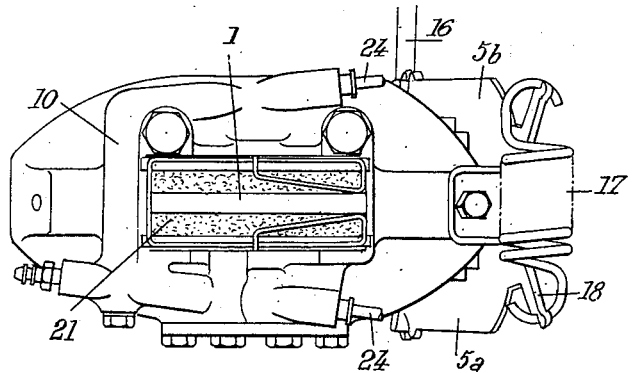
FIG. 4 is a plan view, seen from the top of FIG. 1 of said brake.

According to the embodiment illustrated by FIGS. 1 and 2, use is made of a main brake the linings 21 of which, located on opposite sides of disc 1, are acted upon by respective pistons 22 slidable in cylinders 23 provided directly in support 10 (or rigid therewith), said cylinders being fed with the braking fluid under pressure through connections 24 (FIG. 1).

Of course the main brake might include a sliding or oscillating cylinder, with a piston located on one side of the disc and a reaction piece on the other side.

The operation of the brake above described is as follows:

When both of the cables 15 are made to slide with respect to their respective sheaths, the ends 14 of each pair of levers are moved toward each other, against the action of springs 17. Projections 9 therefore apply linings 4 against discs 1. Every plate 6, supporting a lining 4, is prevented from rotating about the corresponding pivot 7 by the projections of the notch 8 of the lever 5a or 5b carrying said plate.

As linings 4 get worn, they are however kept parallel to the faces of the disc of pivot 7. When the wear exceeds a given limit, it is possible to eliminate or to reduce the play that has taken place by making use of screws 19, the control means including a cable 15 and the corresponding sheath 16 being preferably subjected to a corresponding adjustment. In order to change the linings, it suffices to unscrew pivot 7, to remove the worn linnings from the respective notches 8 and to fit new linings instead of them.

The brake according to the present invention has many advantages over the known brakes of the same type. Among these advantages must be mentioned the possibility of a great multiplication for the braking efforts, owing to the provision of levers 5a and 5b of great length, despite a relatively small space occupied by the device, due to the fact that said levers extend along a great portion of disc 1.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claim.

What I claim is:

In a system including a fixed frame and a driven shaft journaled with respect to said frame, a braking device which comprises, in combination, a disc angularly fixed to the driven shaft, perpendicular thereto and axially coincident with the axis of said shaft, first pivot means carried by said frame in a fixed position with respect thereto, said pivot means being parallel to said disc axis, two flat brake elements parallel to said disc pivotally mounted about said first pivot means, means to bring said brake elements into engagement with the opposed faces of said disc, second pivot means carried by said frame in a fixed position with respect thereto, said second pivot means being perpendicular to said disc axis, a pair of thin flat levers pivotally mounted on said frame about said second pivot means and located on opposite sides of said disc, a portion of each said lever adapted to bear against the center of the respective brake elements and provide the means to brinng said brake elements into engagement with said disc, guide means on said levers for engaging said brake elements to prevent rotation of said brake elements about said first pivot means, each of said thin flat levers having an edge turned towards the corresponding brake element provided with a notch adapted to engage said brake element, the ends of said notch forming said guide means, and control means between said levers for pivoting them about said second pivot means in a direction to apply said brake elements against said disc, wherein, being given a cylinder generated by the straight line parallel to the axis of said disc and bearing against the periphery thereof, each said levers is in the form of a flat plate and located in a plane perpendicular to the axis of said second pivot means, the second pivot means and the point of each of said levers where they cooperate with said control means being located on the outside of said cylinder on the opposite sides thereof, both ends of said thin flat lever being located on the outside of said cylinder, said first pivot means being along a line normal to a radius passing through the center of said brake element, whereby the resultant of the braking forces exerted by said disc on said brake elements during braking substantially passes through said first pivot means.

References Cited by the Examiner

UNITED STATES PATENTS

| | | | |
|---|---|---|---|
| 1,995,135 | 3/1935 | Williams et al. | 188—73 |
| 3,135,359 | 6/1964 | Davis | 188—73 |
| 3,141,527 | 7/1964 | Henderson | 188—73 |

FOREIGN PATENTS

| | | |
|---|---|---|
| 838,505 | 6/1960 | Great Britain. |
| 1,286,456 | 1/1962 | France. |

FERGUS S. MIDDLETON, *Primary Examiner.*

EUGENE G. BOTZ, ARTHUR L. LA POINT,
*Examiners.*